United States Patent [19]

Lee

[11] Patent Number: 5,428,591
[45] Date of Patent: Jun. 27, 1995

[54] TRACK COMPENSATION APPARATUS OF MAGNETOOPTICAL DISK APPARATUS

[75] Inventor: Cheol-won Lee, Euiwang, Rep. of Korea

[73] Assignee: Samsung Electronics Co., Ltd., Kyungki, Rep. of Korea

[21] Appl. No.: 128,967

[22] Filed: Sep. 30, 1993

[30] Foreign Application Priority Data

Feb. 25, 1993 [KR] Rep. of Korea .................. 93-2651

[51] Int. Cl.⁶ ........................................ G11B 7/00
[52] U.S. Cl. ........................... 369/44.34; 369/44.28; 369/44.32
[58] Field of Search ............. 369/44.28, 44.32, 44.34, 369/44.25, 32, 47, 48; 360/77.07, 77.02, 78.05, 78.04

[56] References Cited

U.S. PATENT DOCUMENTS

| | | | |
|---|---|---|---|
| 4,811,316 | 3/1989 | Hosoya | 369/32 |
| 5,001,732 | 3/1991 | Nomura et al. | 369/32 X |
| 5,107,472 | 4/1992 | Fujiwara et al. | 369/44.28 X |
| 5,130,964 | 7/1992 | Ito | 369/44.28 |
| 5,249,213 | 9/1993 | Kobunaya | 369/44.28 X |

*Primary Examiner*—Georgia Y. Epps
*Assistant Examiner*—P. W. Huber
*Attorney, Agent, or Firm*—Lowe, Price, LeBlanc & Becker

[57] ABSTRACT

An apparatus for compensating a track when a track crossing signal is not generated due to an offset detection flag (ODF) region or a defect of a disk, comprises a missed track compensating processor for compensating a missed track signal generated when the light beam passes through the ODF region, and a track counter for mixing a pulse signal of a monostable multivibrator with a compensation signal output from the missed track compensation processor and counting the number of tracks. Thus, the missed track signal which is generated due to the ODF region and disk defects is compensated, thereby accurately counting the number of tracks over which the light beam cross.

14 Claims, 4 Drawing Sheets

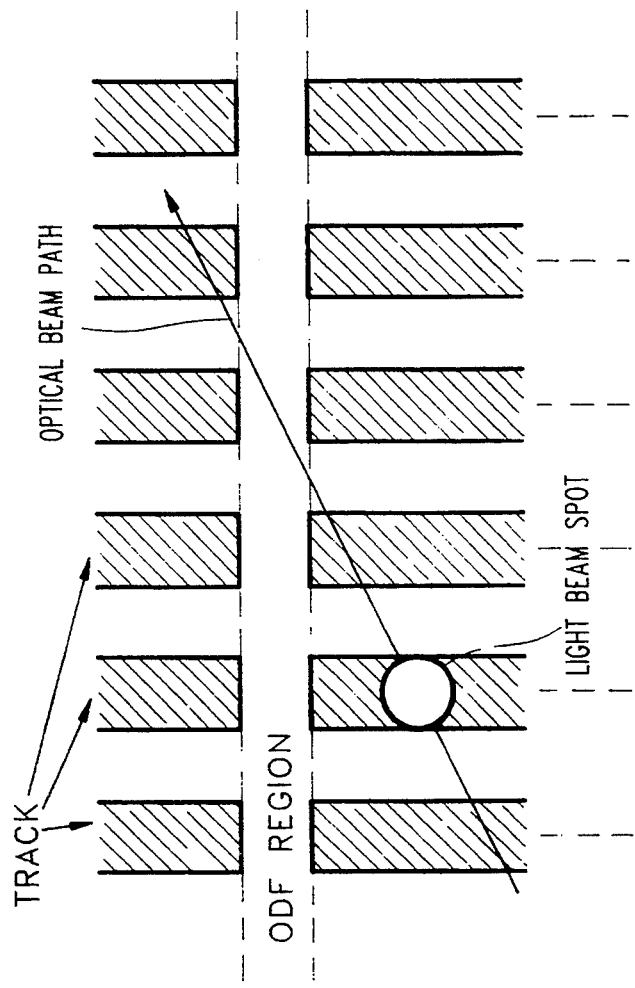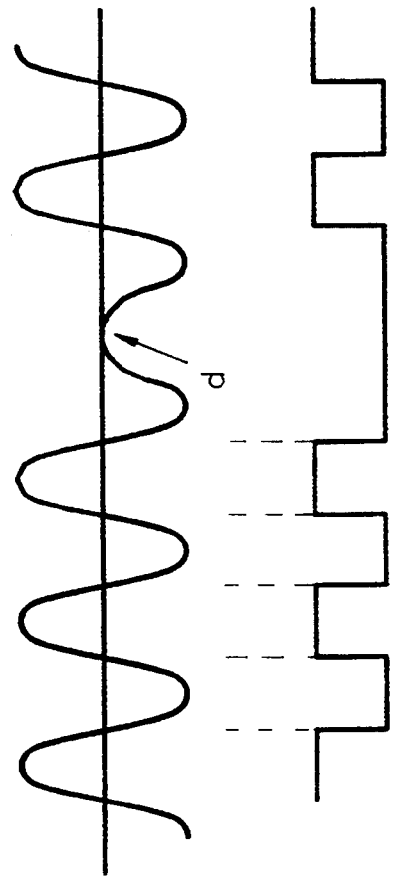
FIG. 1A (PRIOR ART)
FIG. 1B (PRIOR ART)
FIG. 1C (PRIOR ART)

TRACK COMPENSATION APPARATUS OF MAGNETOOPTICAL DISK APPARATUS

BACKGROUND OF THE INVENTION

The present invention relates to a track compensation apparatus in a magnetooptical disk apparatus, and more particularly, to an apparatus for compensating a track when a track crossing signal is not generated due to an offset detection flag region or a defect of the disk.

Generally, the magnetooptical disk apparatus utilizes a track crossing signal which is generated when an optical beam passes over the surface of a disk to count the number of tracks. Also, unless the number of tracks is accurately counted, the location of the optical beam cannot be identified, nor can the target track be swiftly accessed.

The conventional magnetooptical disk apparatus detects a movement distance of a photo beam by possessing a linear scaler in order to move the optical beam to a target track. However, since the track width of the conventional disk is 1.6 $\mu$m and the width of the linear scaler is quite large relatively, that is, 80 $\mu$m, it is difficult to move the optical beam to a target track accurately.

Another conventional magnetooptical disk apparatus does not use the linear scaler, and utilizes a direct seek method for directly counting tracks using a track crossing signal.

FIGS. 1A through 1C are waveform diagrams in connection with a track crossing signal in a magnetooptical disk apparatus using the conventional direct seek method. FIG. 1A shows a trace of a photo beam which passes over the surface of a disk. FIG. 1B is a track crossing signal. FIG. 1C is a signal obtained by performing the binarization of tile track crossing signal of FIG. 1B.

In FIG. 1A, an offset detection flag (ODF) region represents the location of a mirror for correcting tile tracking error offset, as a one-byte area of one sector on the disk. If the photo beam passes through the ODF region, a distorted signal having a non-sinusoidal waveform is generated as the track crossing signal as shown in a portion "d" of FIG. 1B. Finally, as shown in FIG. 1C, since a track crossing binarization signal is not produced, the number of the tracks cannot be accurately counted.

SUMMARY OF THE INVENTION

Therefore, to solve the above problems, it is an object of the present invention to provide a track compensation apparatus which measures a period of a track which is located just before reaching an offset detection flag region, and generates a virtual track count signal to compensate a track crossing signal.

To accomplish the above object of the present invention, there is provided a track compensation apparatus of a magnetooptical disk apparatus having waveform shaping means for waveform-shaping a track crossing signal which is obtained when a light beam traverses tracks of the surface of a disk into a binarization signal, and a first monostable multivibrator for producing a one-shot pulse signal using the signal generated in the waveform shaping means, the track compensation apparatus comprising:

missed track compensation processing means for compensating a missed track signal generated when the light beam passes through an offset detection flag region: and track counting means for mixing a pulse signal of the first monostable multivibrator with a compensation signal output from the missed track compensation processing means and counting the number of tracks.

The present invention constructed as described above measures the period of a track using a predetermined count value with respect to a missed track signal generated when a light beam passes through an offset detection flag region or a defected portion on a disk to generate a virtual track count signal, thereby accurately counting the number of tracks over which the light beam moves.

BRIEF DESCRIPTION OF THE DRAWINGS

The above objects and other advantages of the present invention will become more apparent by describing in detail a preferred embodiment thereof with reference to the attached drawings in which:

FIG. 1A shows a trace of a light beam which passes through the surface of a disk in the conventional magnetooptical disk apparatus;

FIG. 1B is a waveform diagram of a track crossing signal in the conventional magnetooptical disk apparatus:

FIG. 1C is a waveform diagram of a binary signal of the track crossing signal in the conventional magnetooptical disk apparatus;

DETAILED DESCRIPTION OF THE INVENTION

A preferred embodiment of the invention will be described below with reference to the attached drawings.

Figure 2:
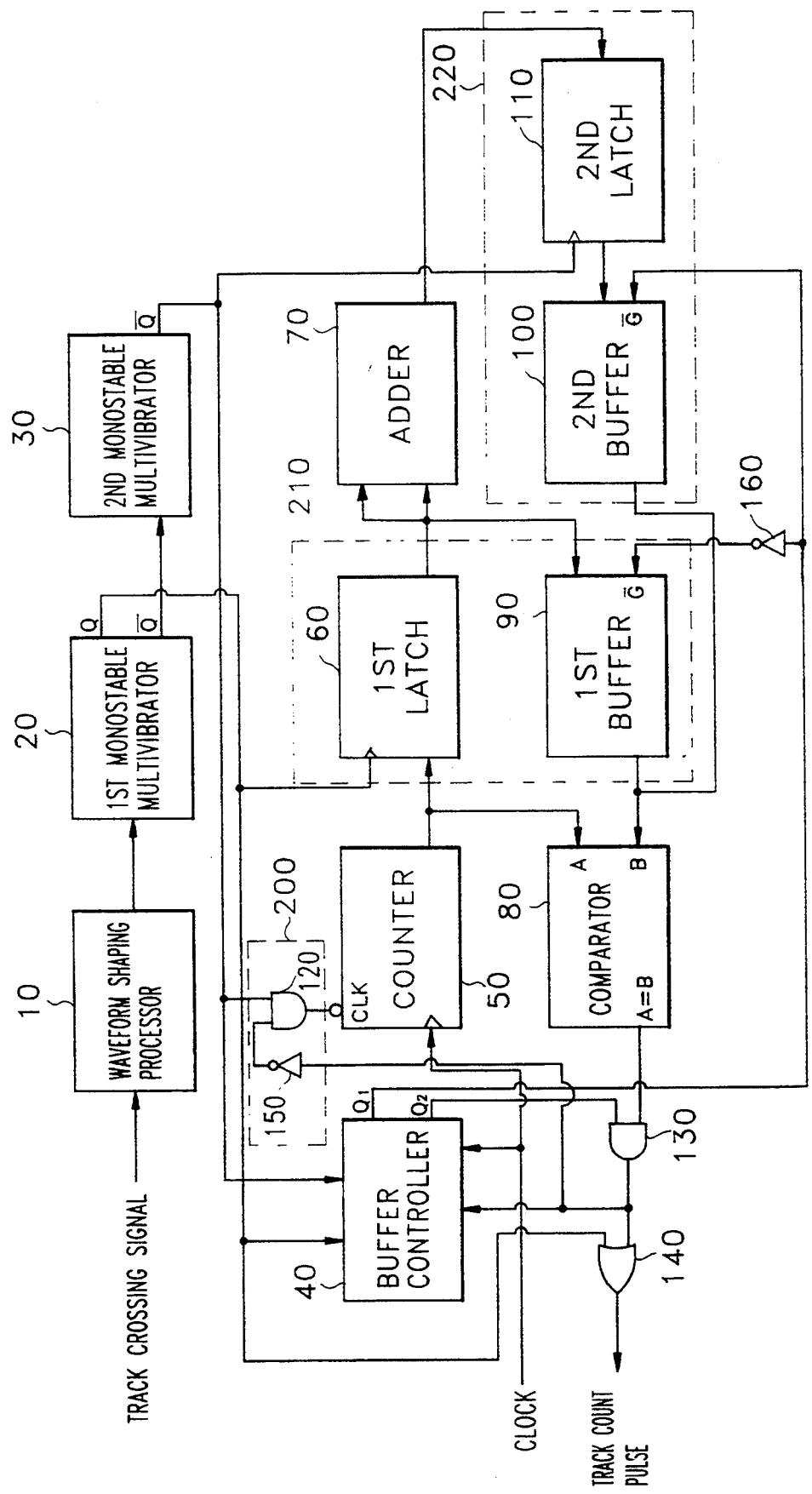
FIG. 2 is a block diagram of a track compensation apparatus according to the present invention.

In FIG. 2 which shows a track compensation apparatus according to the present invention, a missed track compensator comprises a second monostable multivibrator 30, a counter 50, a first latch 60, a first buffer 90, an adder 70, a second latch 110, a second buffer 100, a buffer controller 40 and an AND gate 130.

Figure 4:
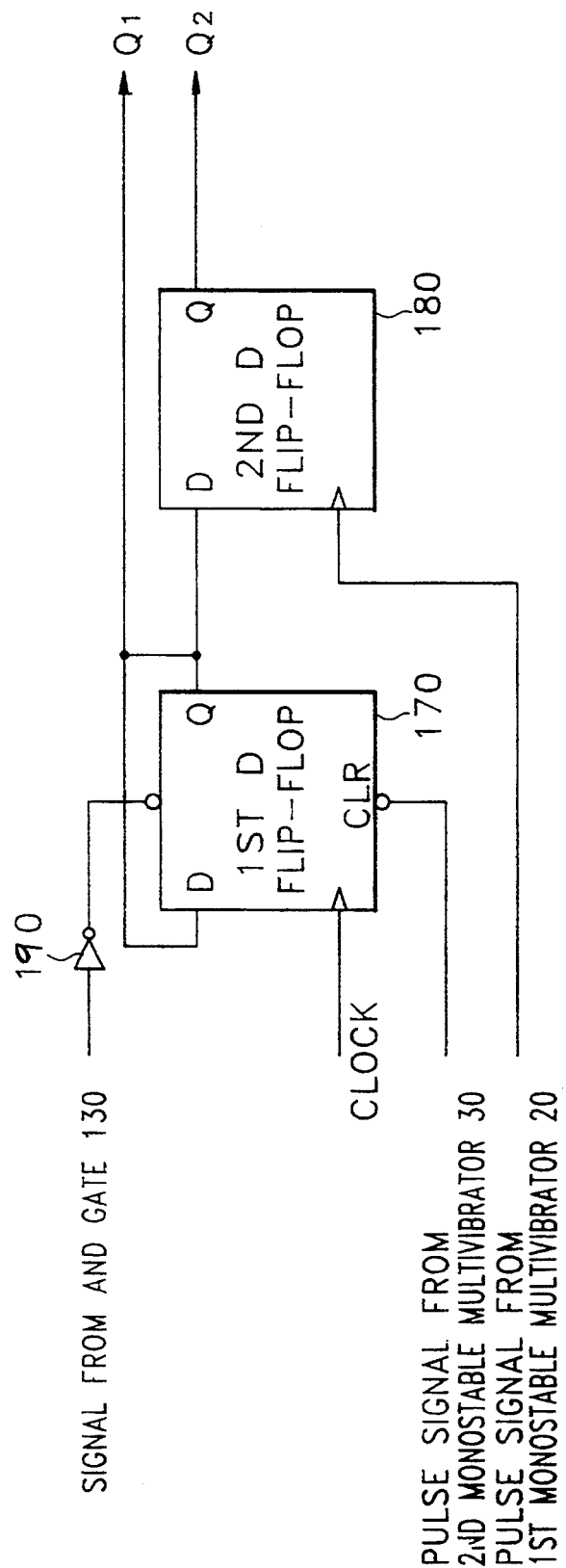
FIG. 4 is a circuit diagram of the buffer controller shown in FIG. 2.

Buffer controller 40 comprises two D flip-flops 170 and 180 and an invertor 190, as shown in FIG. 4.

Next, referring to FIG. 2, a track crossing signal of a disk is input to waveform shaping processor 10. The output of waveform shaping processor 10 is connected to the input of first monostable multivibrator 20. The Q output of first monostable multivibrator 20 is connected to the clock port of first latch 60, an input of buffer controller 40 and an input of an OR gate 140, while the $\overline{Q}$ output thereof is connected to the input of second monostable multivibrator 30. Meanwhile, the $\overline{Q}$ output of second monostable multivibrator 30 serves as the clock of second latch 110, one input of AND gate 120 and another input of buffer controller 40.

A clock signal is input to another input of buffer controller 40 and the clock port of counter 50. The output of counter 50 is the input of first latch 60 and a terminal "A" of comparator 80. The clear port of counter 50 is connected to tile output of AND gate 120. The output of first latch 60 is connected to two inputs of adder 70, to to the input of first buffer 90. The output of adder 70 is input to second latch 110. The output of second latch 110 is input to second buffer 100. The outputs of first and second buffers 90 and 100 are input to a terminal "B" of comparator 80.

The inputs of AND gate 130 are connected to tile output of comparator 80 and a second output $Q_2$ of buffer controller 40, respectively. The output of AND gate 130 is input to one input port of OR gate 140, to an input of buffer controller 40 and to invertor 150. The output of invertor 150 is connected to the other input of AND gate 120. A first output $Q_1$ of buffer controller 40 is connected to an output enable signal terminal $\overline{G}$ of first buffer 90 via invertor 160 and directly to output enable signal terminal $\overline{G}$ of second buffer 100. OR gate 140 outputs a track count pulse.

FIGS. 3A through 3K are waveform diagrams of the signals output at the respective portions shown in FIG. 2.

Figure 3:
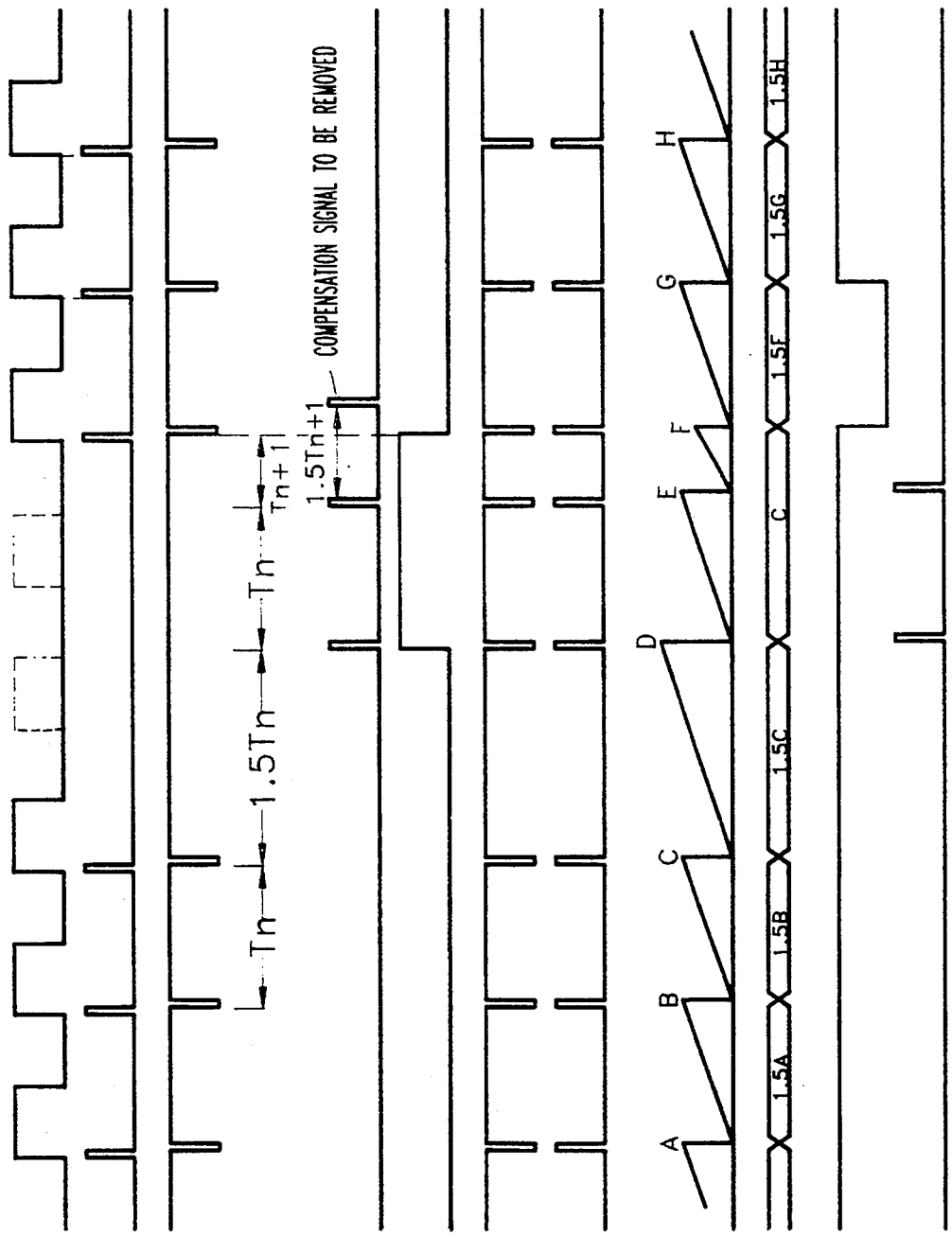
FIGS. 3A through 3K are waveform diagrams of the respective portions shown in FIG. 2.

FIG. 3A is a waveform diagram of the signal which is obtained by performing the binarization of a track crossing signal in waveform shaping processor 10. FIG. 3B is for the Q output of first monostable multivibrator 20. FIG. 3C is for the $\overline{Q}$ output of second monostable multivibrator 30. FIG. 3D is for the output of comparator 80. FIG. 3E is for the first output $Q_1$ of buffer controller 40. FIG. 3F is for a clear signal for counter 50. FIG. 3G is for a track count pulse signal. FIG. 3H is for an input signal at a terminal "A" of comparator 80. FIG. 3I is for another input signal at a terminal "B" of comparator 80. FIG. 3J is for second output $Q_2$ of buffer controller 40. FIG. 3K is for a missed track compensation signal.

Then, the operation of the blocks shown in FIG. 2 will be described with reference to FIGS. 3A through 3K.

If the light beam transversely crosses the track, the track crossing signal can be obtained. In its normal state, the track crossing signal is a sinusoidal waveform. However, if the light beam transversely crosses the ODF region of the disk, the track crossing signal is not generated. The track crossing signal is binarized in waveform shaping processor 10. In FIG. 3A, portions which are represented by dotted lines are portions in which the track crossing signal is not generated when the light beam transversely cross the ODF region.

First monostable multivibrator 20 and second monostable multivibrator 30 generate one-shot pulse signals using the binarized waveform processed in waveform shaping processor 10.

FIGS. 3B and 3C show the signals of the Q output of first monostable multivibrator 20 and the $\overline{Q}$ output of second monostable multivibrator 30, respectively. Second monostable multivibrator 30 delays the pulse signal of first monostable multivibrator 20 by one shot pulse width and outputs the delayed signal as an inverted phase pulse as shown FIGS. 3B and 3C.

Counter 50 outputs the counted value according to the clock signal. Here, first latch 60 latches the output value of counter 50 while receiving the pulse signal of first monostable multivibrator 20 as a clock signal. The latched value in first latch 60 is supplied to adder 70 and first buffer 90. Also, the value in first latch 60 shifted right by one bit is supplied to adder 70. First buffer 90 temporarily stores the value output from first latch 60.

Adder 70 adds the latched value output from first latch 60 to the one-bit-right-shifted value supplied also by first latch 60, so as to obtain a predetermined multiple of the latched value by first latch 60, and outputs the added value. The predetermined multiple value is 1.5 times the latched value. Second, latch 110 latches the value output from adder 70 while receiving the pulse signal of second monostable multivibrator 30. The latched value in second latch 110 is input to second buffer 100 which temporarily stores the value output from second latch 110.

The outputs of first and second buffers 90 and 100 are controlled by first output $Q_1$ of buffer controller 40 which is connected to first buffer 90 via invertor 160. Accordingly, the outputs of first and second buffers 90 and 100 are exclusively logically operated with respect to each other. In FIG. 3E, a logic high signal enables the output of first buffer 90, while the logic low portion thereof enables the output of second buffer 100.

When the track crossing signal is in a normal state, the output value of second buffer 100 is input to terminal "B" of comparator 80. That is, a predetermined multiple of the output value of first latch 60 is input to terminal "B" of comparator 80. Comparator 80 compares the value input to terminal "B" of comparator 80 with the value output from counter 50 whenever the clock signal is input to counter 50. As shown in FIGS. 3H and 3I, since a predetermined multiple of the output value according to the previous clock signal of counter 50 is input to terminal "B" of comparator 80 in a normal state, a logic low signal is output from the output terminal "A=B" of comparator 80.

When the missed track signal without track crossing signal is generated, since the pulse signal of first monostable multivibrator 20 is not input to the clock terminal of first latch 60, counter 50 outputs the counted value corresponding to a predetermined multiple due to an increased counting period. Thus, comparator 80 outputs a logic high signal from output terminal "A=B" when the values of terminals "A" and "B" are the same.

AND gate 130 logically AND-operates second output $Q_2$ of buffer controller 40 and the output value of comparator 80. That is, the signals shown in FIGS. 3D and 3J are logically AND-operated. The output signal of AND gate 130 changes first output $Q_1$ of buffer controller 40 into a high value, to enable the output of first buffer 90.

Also, the output value of AND gate 130 is inverted by invertor 150 and input to AND gate 120 to clear counter 50.

If the output of first buffer 90 is enabled, the latched value of first latch 60, that is, the latched value immediately before latching, is input to comparator 80. Buffer controller 40 maintains first output $Q_1$ as a high logic state until the signal of first monostable multivibrator 20 goes high after the output of comparator 80 goes high for the first time.

FIG. 4 is a detailed circuit diagram of buffer controller 40 shown in FIG. 2.

The pulse signal of second monostable multivibrator 30 is input to the clear port of first D flip-flop 170. The pulse signal of first monostable multivibrator 20 is input to the clock port of second D flip-flop 180. The output signal of AND gate 130 is supplied to invertor 190. The clock signal is input to the clock port of first D flip-flop 170.

First output signal $Q_1$ is fed back to the data input port of first D flip-flop 170 as an input. Accordingly, the Q output of first D flip-flop 170 does not change until a preset command is input via its preset terminal. However, when the output of AND gate 130 goes high, the Q output of first D flip-flop 170 is set to a logic "1" by the preset signal. Buffer controller 40 maintains first output $Q_1$ as a logic "1" until buffer controller 40 is cleared by the output of second monostable multivibrator 30. Also, buffer controller 40 varies the value of second output $Q_2$ according to the clock from first monostable multivibrator 20.

During the "high" interval of first output $Q_1$ from buffer controller 40, comparator 80 outputs a logic high pulse for every tracking period. AND gate 130 generates a compensation pulse signal with respect to the missed track signal as shown in FIG. 3K according to the output of comparator 80 and second output $Q_2$ of buffer controller 40.

On the other hand, second output $Q_2$ of buffer controller 40 is a missed track compensation-off signal. If tile pulse signal of first monostable multivibrator 20 is generated after compensating tile missed track signal, the value of a short period, such as $T_{n+1}$ shown in FIG. 3C is normally latched in first latch 60. Accordingly, if a missed track compensation pulse is again generated at one and a half times the value, misoperation occurs. Thus, second output $Q_2$ is for eradicating such misoperation.

OR gate 140 OR-operates the missed track compensation signal of AND gate 130 and the pulse signal of first monostable multivibrator 20, to generate one pulse for each tracking period at the rising edge of the track crossing binarization signal, thereby producing a track count pulse.

As described above, the present invention compensates the missed track signal which is generated by a defect of a disk or the ODF region, thereby accurately identifying the number of tracks over which light beam across.

What is claimed is:

1. A track compensation apparatus of a magnetooptical disk apparatus having waveform shaping means for waveform-shaping a track crossing signal which is obtained when a light beam traverses tracks of the surface of a disk into a binarization signal, and a first monostable multivibrator for producing a one-shot pulse signal using the signal generated in the waveform shaping means, said track compensation apparatus comprising:
   missed track compensation processing means for compensating a missed track signal generated when the light beam passes through an offset detection flag region, and for producing a compensation signal; and
   track counting means for mixing a pulse signal of the first monostable multivibrator with the compensation signal output from said missed track compensation processing means, and for counting the number of tracks,
   wherein said missed track compensation processing means comprises
   a counter generating a count signal;
   multiplier means for multiplying the count signal received from said counter by a predetermined multiplier when the missed track signal is not generated producing a multiplied count signal; and
   comparing means for comparing the multiplied count signal with the count signal and for compensating the missed track signal when said multiplied count signal substantially equals the count signal.

2. A track compensation apparatus of a magnetooptical disk apparatus having waveform shaping means for waveform-shaping a track crossing signal which is obtained when a light beam traverses tracks of the surface of a disk into a binarization signal, and a first monostable multivibrator for producing a one-shot pulse signal using the signal generated in the waveform shaping means, said track compensation apparatus comprising:
   missed track compensation processing means for compensating a missed track signal generated when the light beam passes through an offset detection flag region, and for producing a compensation signal; and
   track counting means for mixing a pulse signal of the first monostable multivibrator with the compensation signal output from said missed track compensation processing means, and for counting the number of tracks,
   wherein said missed track compensation processing means comprises:
   a second monostable multivibrator for delaying the pulse signal of said first monostable multivibrator by one shot pulse width and outputting the delayed signal as a reverse phase pulse;
   a counter for measuring the period of the track crossing signal and performing a counting operation in an increased counting period when the missed track signal is generated;
   a first memory device for temporarily storing the output value of said counter;
   an adder for adding a first output value of said first memory device to a first predetermined multiple of said first output value of said memory device thereof, to obtain a second predetermined multiple of the output value of said counter;
   a second memory device for temporarily storing the output value of said adder;
   a comparator for comparing the output value of said counter and the output value of one selected between said first memory device and second memory device;
   a buffer controller for controlling to select one between the outputs of said first and second memory device;
   clear command means for clearing said counter; and
   an AND gate for outputting a missed track compensation signal for compensating said missed track signal according to the output value of said comparator.

3. The track compensation apparatus according to claim 2, wherein said first memory comprises a first latch for latching the value of said counter and generating said first predetermined multiple, and a first buffer for temporarily storing the value of said first latch to input the stored value to said comparator.

4. The track compensation apparatus according to claim 2, wherein the counting period when a normal track signal is generated in said counter is the same as the pulse period of said first monostable multivibrator.

5. The track compensation apparatus according to claim 2, wherein said second memory comprises a second latch for latching the value of said adder, and a second buffer for temporarily storing the value of said second latch to input the stored value to said comparator.

6. The track compensation apparatus according to claim 3, wherein said first latch utilizes the output signal supplied from said first monostable multivibrator in latching.

7. The track compensation apparatus according to claim 5, wherein said second latch utilizes the output signal from said second monostable multivibrator in latching.

8. The track compensation apparatus according to claim 2, wherein said comparator outputs a compensation signal for compensating the missed track signal when said counter generates a count signal in a predetermined increased counting period.

9. The track compensation apparatus according to claim 2, wherein said clear command means comprises an AND gate and an inverter.

10. The track compensation apparatus according to claim 2, wherein said buffer controller generates a missed track compensation-off signal for removing the missed track signal generated for crossing a normal track.

11. The track compensation apparatus according to claim 2, wherein said buffer controller comprises a plurality of flip-flops and an invertor.

12. The track compensation apparatus according to claim 1, wherein said track counting means comprises an OR gate for logically summing the pulse signal of said first monostable multivibrator and the output signal of said missed track compensation processor.

13. The track compensation apparatus according to claim 2, wherein said second predetermined multiple obtained by said adder is 1.5.

14. A track compensation apparatus of a magnetooptical disk apparatus which uses a light beam to generate a track crossing signal to count tracks of a disk, comprising:

a first monostable multivibrator for producing a pulse signal responsive to the track crossing signal;

missed track compensation processing means for compensating a missed track signal generated when the light beam passes through an offset detection flag region, and for producing a compensation signal; and track counting means for mixing the pulse signal of the first monostable multivibrator with the compensation signal output from said missed track compensation processing means, and for counting the number of tracks, wherein said missed track compensation processing means comprises a counter generating a count signal;

multiplier means for multiplying the count signal received from said counter by a predetermined multiplier when the missed track signal is not generated producing a multiplied count signal; and comparing means for comparing the multiplied count signal with the count signal and for compensating the missed track signal when said multiplied count signal substantially equals the count signal.

* * * * *